United States Patent [19]

Gibbs et al.

[11] 4,324,714

[45] Apr. 13, 1982

[54] VINYLIDENE CHLORIDE POLYMER MICROGEL POWDER LACQUER COATING COMPOSITION AND SUBSTRATES COATED THEREWITH

[75] Inventors: Dale S. Gibbs; James F. Sinacola, both of Midland; Dan E. Ranck, Sanford, all of Mich.

[73] Assignee: The Dow Chemical Company, Midland, Mich.

[21] Appl. No.: 145,169

[22] Filed: Apr. 30, 1980

Related U.S. Application Data

[63] Continuation-in-part of Ser. No. 942,516, Sep. 15, 1978, abandoned.

[51] Int. Cl.$^3$ ............................ C09D 3/74; C08K 5/15
[52] U.S. Cl. ................................. 524/113; 524/832; 524/834
[58] Field of Search ......................................... 260/30.4

[56] References Cited

U.S. PATENT DOCUMENTS 3,317,450  5/1967  Grenley et al. .................... 260/29.7
3,424,706  1/1969  Smith et al. ......................... 526/343

FOREIGN PATENT DOCUMENTS 43-433633  3/1968  Japan ................................. 260/29.7
  967051   8/1964  United Kingdom ............. 526/323.2

*Primary Examiner*—William F. Hamrock
*Assistant Examiner*—Peter F. Kulkosky
*Attorney, Agent, or Firm*—R. B. Ingraham

[57] ABSTRACT

A lacquer coating composition containing a crosslinked vinylidene chloride polymer microgel powder which is recovered from a latex obtained by emulsion polymerizing about 85 to 92 parts by weight of vinylidene chloride, about 8 to 15 parts by weight of a copolymerizable ethylenically unsaturated comonomer, and a minor amount of a copolymerizable crosslinking polyfuntional comonomer. Coatings prepared from such lacquers have excellent barrier and heat-sealing properties.

8 Claims, No Drawings

VINYLIDENE CHLORIDE POLYMER MICROGEL POWDER LACQUER COATING COMPOSITION AND SUBSTRATES COATED THEREWITH

CROSS-REFERENCE TO RELATED APPLICATION

This application is a continuation-in-part of the copending application Ser. No. 942,516, filed Sept. 15, 1978, now abandoned.

BACKGROUND OF THE INVENTION

The present invention relates to lacquer coating compositions and, more particularly, to lacquer coating compositions containing vinylidene chloride polymers.

In recent years, vinylidene chloride polymer lacquers or solutions have been widely used, particularly in the food industry, as coatings for plastic films, cellophane and like packaging materials due to their high resistance to chemicals and oils, low temperature heat-sealing properties, and excellent resistance to the transmission of oxygen and moisture vapor.

Nevertheless, the linear vinylidene cloride polymers which are presently being used in such lacquers have exhibited a number of chronic problems which reduce the desirability of coatings prepared therefrom. In the first instance, it is difficult to control the molecular weight and composition distribution of the polymers, which leads to uncontrollable variations in heat-seal temperature and permeability. In addition, most of the comonomers which have been used to prepare such polymers react at a rate faster than vinylidene chloride, thereby leading to extensive composition drift both in bath and continuous addition emulsion polymerization. Such composition drift to higher and higher vinylidene chloride content results in vinylidene chloride fractions which are metastable in the lacquer solution. These metastable fractions tend to crystallize in the lacquer solution and cause problems with haze in the resulting coatings.

Accordingly, it is an object of the present invention to provide a vinylidene chloride polymer lacquer coating composition which avoids the above-mentioned problems.

SUMMARY OF THE INVENTION

In one embodiment, the present invention provides a lacquer coating composition comprising an organic solvent and a crosslinked vinylidene chloride polymer microgel powder which has been recovered from a latex obtained by emulsion polymerizing a monomer mixture consisting essentially of (a) about 85 to 92 parts by weight of vinylidene chloride, (b) about 8 to 15 parts by weight of an ethylenically unsaturated comonomer, and (c) a minor amount of a crosslinking polyfunctional comonomer, wherein the microgels in the resulting latex have a gel content of about 25 to 99 percent.

In another embodiment, the present invention provides an article of manufacture comprising a substrate having at least one square thereof coated with a dried residue of such a lacquer composition.

DETAILED DESCRIPTION OF THE INVENTION

The crosslinked vinylidene chloride polymer microgel powders of the present invention are recovered from latices which have been prepared by polymerization in an aqueous emulsion according to processes well known in the art. Preferably, the polymerization is carried out by essentially continuous, carefully controlled addition of the requisite polymerization constituents (including polymerization initiator systems if desired) to the aqueous medium.

Generally, it is preferred to start the polymerization by adding a small amount of monomeric material to the aqueous medium and then adding the desired polymerization initiator to form a polymeric seed latex to aid in the control of particle size. The aqueous medium in which the seed latex is formed will contain the necessary surfactants to form the emulsion and will generally be adjusted to the desired pH value, as is well known in the art. Following the formation of the seed latex, the remaining amount of monomeric material is continuously added under carefully controlled conditions to the aqueous medium.

In accordance with the present invention, the microgel latices are prepared by emulsion polymerizing about 85 to 92, preferably about 90 to 92, parts by weight of vinylidene chloride; about 8 to 15, preferably about 8 to 10, parts by weight of a copolymerizable ethylenically unsaturated comonomer; and a minor amount of a copolymerizable crosslinking polyfunctional comonomer. The microgels in the resulting latices will generally have a size less than about 0.5 micron, preferably in the range of about 0.1 to about 0.3 micron.

Exemplary copolymerizable ethylenically unsaturated comonomers which can be utilized in the present invention include the alkyl esters of acrylic and methacrylic acids such as methyl acrylate and methyl methacrylate; nitriles of ethylenically unsaturated carboxylic acids such as acrylonitrile and methacrylonitrile; vinyl esters of saturated carboxylic acids such as vinyl acetate and vinyl propionate; vinyl halides such as vinyl chloride and vinyl bromide; and other ethylenically unsaturated monomers known to polymerize with vinylidene chloride. Of these, methyl acrylate, acrylonitrile, and methyl methacrylate are preferred.

Exemplary copolymerizable crosslinking polyfunctional comonomers which are suitable for use in the present invention include 1,3-butylene glycol dimetacrylate, 1,3-butylene glycol diacrylate, 1,4-butane diol dimethacrylate, 1,4-butane diol diacrylate allyl acrylate; allyl methacrylate, vinyl acrylate, vinyl methacrylate, and the like.

The actual amount of crosslinking monomer required is not critical and will vary with the crosslinking efficiency of the particular monomer employed. Typically, the amount will range from about 2 to 10, preferably 2 to 6 parts by weight. Stated differently, it is desirable to use sufficient crosslinking monomer to provide a gel content of about 25 to 99 percent, preferably about 50 to 99 percent, in the resulting vinylidene chloride polymer microgel. If the gel content is less than that suggested, the microgel powders will swell or tend to dissolve in solvents and behave much like the conventional linear vinylidene chloride polymers, thereby eliminating the beneficial properties of the coating composition and coatings of the present invention.

As used herein, "percent gel" is determined by the following technique: Add 36.6 ml tetrahydrofuran (THF) and a predetermined amount ($W_S$), usually about 0.7–1.2 g, of the desired microgel to a 50 ml centrifuge tube. Cap the tube and then agitate it overnight (usually about 12 hours) on a horizontal agitator. Thereafter, centrifuge the tube at 19,000 rpm for about 1 hour at 5°

C. Extract 10 ml of the resulting supernatant liquid and place it into an evaporating dish. Evaporate most of the THF over low heat and then complete the drying by placing the dish in an oven for about 1 hour at 40° C. Finally, determine the weight ($W_F$) of resin in the dish and calculate gel content by the following formula:

$$\left[\text{Percent Gel} = 100 \times 1 - \frac{3.66\, W_F}{W_S}\right]$$

The crosslinked vinylidene chloride polymer microgel powders used in the present invention are recovered from the microgel latices according to conventional techniques such as coagulation, freeze drying, and air drying. Preferably, the powders are recovered by coagulating the latex and then washing and drying the coagulum to produce a fine powder. The optimum temperature for coagulation will vary depending upon the type and amount of comonomer employed in preparing the microgels. Generally, the coagulation temperature will be in the range of about 50° to 90° C., preferably from about 50° to 70° C.

Generally, the solvents which can be suitably employed in the lacquer coating compositions of the present invention are any of those which have been used with linear vinylidene chloride polymers such as tetrahydrofuran mixtures of tetrahydrofuran and toluene. Surprisingly, the microgel powders of the present invention do not have to dissolve in the solvent, in order to obtain transparent coatings as is typical for conventional linear polymers. It is only necessary that the microgels swell sufficiently so that they are able to uniformly disperse in the solvent. Accordingly, it is possible to use more of the conventional organic solvents and less of the expensive specialized solvents than was heretofore possible with linear vinylidene chloride polymers. For example, some embodiments of the present microgels can be prepared to permit the use of a solvent mixture comprising a major proportion of toluene and a minor proportion of tetrahydrofuran, in contrast with the reverse ratio of solvents commonly used in the coating industry.

The vinylidene chloride polymer microgel lacquers of the present invention can be applied to substrates by conventional methods such as spraying, dipping, brushing, rolling, and the like. Substrates which are suitably coated are any of those which are known to be acceptably coated by conventional vinylidene chloride polymer lacquers.

The amount of microgel powder which may be included in the lacquer coating compositions will vary with the particular powder used and with the coating method employed. Generally, the amount will be less than about 20, preferably between about 10 and 15, percent by weight fo the total coating composition. The lacquer coating compositions may also contain conventional additives such as dyes, pigments, heat and light stabilizers, and so forth, as necessary or desired for particular applications, without adversely affecting the desirable properties of such compositions.

The following specific examples illustrate the invention but are not to be taken as limiting its scope. Parts and percentages are by weight unless otherwise indicated.

EXAMPLE 1

In accordance with the present invention, two different crosslinked vinylidene chloride polymer microgel latices were prepared by emulsion polymerization using sodium persulfate thermal initiator and continuous addition of mixed monomers.

Each emulsion polymerization was conducted in a one-gallon reactor with agitator and temperature control. The initial water phase charged to the reactor is listed below:

1500 g distilled water
14.2 g AEROSOL MA emulsifier (80% active)
3.4 g TERGITOL 08 emulsifier (39% active)
3.0 g initiator (sodium persulfate)
10.9 g itaconic acid The following monomer mixture was used:

| Monomer[1] | Mole % | Parts | Grams |
|---|---|---|---|
| VDC | 90 | 89.71 | 1794 |
| MMA | 10 | 10.29 | 206 |
| BGDM | 3.54[2] | 4.0 | 80 |

Notes:
[1] VDC = vinylidene chloride; MMA = methyl methacrylate; BGDM = butylene glycol dimethacrylate
[2] based on the moles of VDC + MMA In each of the polymerizations, the initial water phase was charged to the reactor and a vacuum was applied (approximately 25 inches Hg) for 10 minutes while heating the reactor to 45° C. With the contents of the reactor at 45° C. and agitation at 200 rpm, the vacuum was shut off and an initial shot of 90 g of the monomer mixture was added to form a seed latex. When the seed latex reaction had proceeded until there was a pressure drop in the reactor of 2 psi, the monomer mixture was fed at 118 g/hr and continued for 12 hours. The total weight of monomer added, including the seed latex monomer, was 1500 g.

When the continuous feeding of monomer was completed, different finishing steps were used in the polymerization techniques to obtain the two different microgel latices:

Finishing Step #1—In this finishing step, the reaction was completed after the monomer feed was shut off by allowing the reaction to proceed with agitation to level pressure at 45° C., which took about two hours. The latex was then cooled and removed from the reactor in preparation for polymer recovery.

Finishing Step #2—In this finishing step, 15 minutes before the end of monomer feed, a 0.37% solution of sodium bisulfite was added at 100 g/hr for two hours while maintaining the temperature at 45° C. In addition, 3 percent, based on the combined weight of the VDC and MMA used, of methyl acrylate (MA) was added over a 30-minute period after the monomer feed was shut off. After the bisulfite stream had been added for the two-hour period, that stream was shut off and the latex was removed from the reactor for polymer recovery.

The polymer microgel powders were separately recovered from each of the resulting latices according to the following $CaCl_2$ coagulation procedure: 35 cc of 30% $CaCl_2$ was mixed with 1000 cc water and heated to 40° C. Then, 300 cc of latex was slowly added to the $CaCl_2$ solution with vigorous agitation. The temperature of the mixture was then increased to 70° C. to bring about crystallization and set the crumb size. The mixture of coagulated microgels, water, and CaCl₂ was then rapidly cooled to room temperature with ice and the microgels collected in a centrifuge with water washing. The microgels were dried to less than 2% water content for evaluation as a coating material. Each of the so-obtained crosslinked vinylidene chloride polymer microgel powders had a gel content above 50 percent.

EXAMPLE 2

The microgel powders prepared according to Example 1 were evaluated for lacquer coating performance.

Lacquer stability testing for linear copolymer solutions normally emphasizes the haze test using light transmission as a measure of lacquer clarity. However, the microgel lacquers of the present invention are very turbid right from the start, so haze or light transmission values are not useful in measuring the stability of such lacquers. Accordingly, lacquer stability was determined by measuring the viscosity of 20 weight percent microgel in a solvent mixture. For a lacquer to be satisfactory, the viscosity must not drift up significantly in 24 hours, e.g., if starting at 20 cps, viscosity drift above 30 cps in 24 hours would not be desirable.

Coating tests were conducted on coated polyester film. The film was coated with a 15 percent polymer solids lacquer using a solvent mixture of 65/35 weight ratio THF/TOL. The coating weight was adjusted to 4 g/m². The coated film was aged 16 hours at 60° C. to insure development of crystallinity before testing the coating.

Moisture vapor transmission rate (MVTR) was measured with a Reigel-Mocon Mode IRD-2 Infrared Diffusometer. The data were reported as grams H₂O passed per 100 square inches in 24 hours for the coating weight of 4 g/m².

A Robot automatic controlled air operated jaw sealer was used for measuring the minimum heat-seal temperature (MHST). Heat seals were made at 5 degree intervals between 95° C. and 135° C. using 20 psi jaw pressure and one second dwell time. The MHST is the temperature at which coating deformation is first observed when the seal is opened.

Cold peel adhesion (CPA) was evaluated by coating one side of a polyester film with a microgel lacquer containing a small amount of dye. The coating was cured for 3 minutes at 120° C. and then conditioned for 16 hours at 90 percent relative humidity and 100° F. The coated film was cut into one inch wide strips and a piece of glass fiber-reinforced tape was applied both to the coated side and to the uncoated side of the strips. The tapes were pulled apart to separate the coating from the film using an Instron tensile tester. The results are expressed as grams adhesion per inch of width.

Table I sets forth the composition of the interpolymers and the lacquer stability, MHST, CPA, and MVTR of coatings prepared therefrom. For purposes of identification, the lacquers of the present invention are hereinafter identified as Samples D and E. For purposes of comparison, a series of lacquers containing different vinylidene chloride polymers were prepared and tested substantially as described above. These lacquers are identified in Table I as Samples A, B, and C.

TABLE I
POLYMER COATING PROPERTIES

| Sample | Lacquer Stability | MVTR (g/100 in²) 24 Hours) | MHST (°C.) | CPA (g/in) |
|---|---|---|---|---|
| For Comparison | | | | |
| A | Fair at 24 hrs[1] | 0.18 | 110 | 20 |
| B | Very good at 24 hrs[1] | 0.29 | 105 | 20 |
| C | Poor at 3 hrs[1] | 0.14 | 125 | 30 |
| The Invention | | | | |
| D | Very good at 2 days[1] | 0.18 | 110 | 160 |
| E | Very good at more than 5 days[2] | 0.41 | 95 | >100 |

Notes:
[1] Solvent mixture comprising 65 percent tetrahydrofuran (THF) and 35 percent toluene (TOL).
[2] Solvent mixture comprising 65 percent TOL and 35 percent THF.
Sample Polymer Identification
A. Conventional non-crosslinked, emulsion polymerized polymer of 87 percent VDC, 10 percent methacrylonitrile (MAN), and 3 percent MMA, having a particle size of about 0.15 micron.
B. Conventional non-crosslinked, emulsion polymerized polymer of 92 percent VDC, 5.3 percent acrylonitrile (VCN) and 2.7 percent MMA, having a particle size of about 0.15 micron.
C. Conventional non-crosslinked, emuslion polymerized polymer of 90 percent VDC and 10 percent MMA, having a particle size of about 0.16 micron.
D. Polymer microgel powder obtained in Example 1 using Finishing Step No. 1.
E. Polymer microgel powder obtained in Example 1 using Finishing Step No. 2.

The data set forth above illustrate that the polymer microgel powders used in the present invention are capable of forming highly effective coating materials from solvents normally used to dissolve vinylidene chloride polymers. Such coatings are also characterized by significantly enhanced adhesion to polyester film substrates as compared to conventional, non-crosslinked vinylidene chloride polymer coating materials. Such enhanced adhesion may well be due to the morphology of the prescribed polymer microgel. Similar good results are obtained using any of the polymer microgel lacquer coating compositions of the present invention.

What is claimed is:

1. A lacquer coating composition comprising an organic solvent and a crosslinked vinylidene chloride polymer microgel powder dispersed therein, said powder being recovered from a latex obtained by emulsion polymerizing a monomer mixture consisting essentially of (a) about 85 to 92 parts by weight of vinylidene chloride, (b) about 8 to 15 parts by weight of a copolymerizable ethylenically unsaturated comonomer, and (c) from about 2 to about 10 parts by weight of a copolymerizable crosslinking polyfunctional comonomer wherein the microgels in the resulting latex have a gel content in the range of about 25 to 99 percent.

2. A lacquer coating composition according to claim 1 wherein the monomer mixture consists essentially of (a) about 90 to 92 parts by weight of vinylidene chloride, (b) about 8 to 10 parts by weight of a copolymerizable ethylenically unsaturated comonomer, and (c) from about 2 to about 10 parts by weight of a copolymerizable crosslinking polyfunctional comonomer, wherein the microgels in the resulting latex have a gel content in the range of about 50 to 99 percent.

3. A lacquer coating composition according to claim 1 wherein the copolymerizable ethylenically unsaturated comonomer is selected from the group consisting of alkyl esters of acrylic and methacrylic acid, nitriles of ethylenically unsaturated carboxylic acids, vinyl esters of saturated carboxylic acids, and vinyl halides.

4. A lacquer coating composition according to claim 3 wherein the copolymerizable ethylenically unsaturated comonomer in methyl acrylate, acrylonitrile, or methyl methacrylate.

5. A lacquer coating composition according to claim 1 wherein the copolymerizable crosslinking polyfunctional comonomer is selected from the group consisting of 1,3-butylene glycol diacrylate, 1,4-butane diol diacrylate, allyl acrylate, vinyl acrylate, 1,3-butylene glycol dimethacrylate, 1,4-butane diol dimethylacrylate, allyl methacrylate, and vinyl methyacrylate.

6. A lacquer coating composition according to claim 1 wherein, in the emulsion polymerization, the monomer mixture is continuously added under carefully controlled conditions to an aqueous medium and subsequent thereto a minor amount of methyl acrylate is added to the aqueous medium and polymerized therein.

7. A lacquer coating composition according to claim 1 wherein the solvent comprises tetrahydrofuran or a mixture of tetrahydrofuran and toluene.

8. An article of manufacture comprising a substrate having at least one surface thereof coated with a dried residue of a composition according to claims 1 or 2.

* * * * *